United States Patent [19]

Ogawa et al.

[11] Patent Number: 4,787,737
[45] Date of Patent: Nov. 29, 1988

[54] PROJECTION DISPLAY APPARATUS

[75] Inventors: Masahiro Ogawa; Tatsuo Shimazaki, both of Tokyo, Japan

[73] Assignee: Casio Computer Co., Ltd., Tokyo, Japan

[21] Appl. No.: 26,673

[22] Filed: Mar. 16, 1987

[30] Foreign Application Priority Data

Mar. 26, 1986 [JP] Japan .................. 61-42975[U]
Sep. 26, 1986 [JP] Japan .................. 61-147234[U]

[51] Int. Cl.⁴ .......................................... G03B 21/16
[52] U.S. Cl. .................................. 353/57; 353/60
[58] Field of Search ............................ 353/52-61

[56] References Cited

U.S. PATENT DOCUMENTS

| | | | |
|---|---|---|---|
| 2,837,965 | 6/1958 | Goldsmith | 353/54 |
| 3,250,175 | 5/1966 | Braun | 353/61 |
| 3,400,995 | 9/1968 | Borberg | 353/54 X |
| 3,844,650 | 10/1974 | Nicholson et al. | |
| 3,895,866 | 7/1975 | Ouervain et al. | |
| 4,453,810 | 6/1984 | Curiel | 353/57 X |

FOREIGN PATENT DOCUMENTS 1027905 11/1955 Fed. Rep. of Germany ........ 353/57

Primary Examiner—Harry N. Haroian
Attorney, Agent, or Firm—Frishauf, Holtz, Goodman & Woodward

[57] ABSTRACT

A projection display apparatus includes a light source unit for generating light for image formation, an electro-optical display device for displaying an optical image by utilizing the light emitted from the light source unit, and an enlarging/projection lens. The light source unit, the display device, and the projection lens are accommodated in a housing with vent openings. The housing also includes a fan for cooling the interior of the housing with cool air and a cooler for maintaining a display panel within a predetermined temperature range. The light source unit includes a lamp and a reflector and is designed not to cause image deformation and formation of a shadow of a discharge portion. In order to display a television image on the display device, all television image display circuit units excluding an antenna are accommodated in the housing. The enlarging/projection lens can control a magnification and a focal point of the image projected on the screen.

9 Claims, 13 Drawing Sheets

FIG. 6
FIG. 9
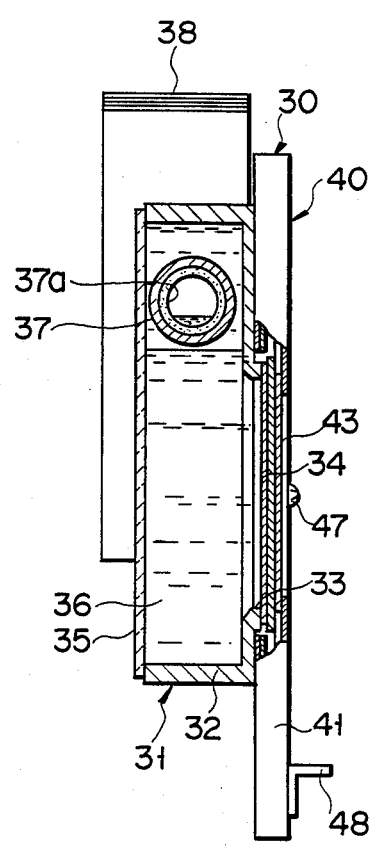
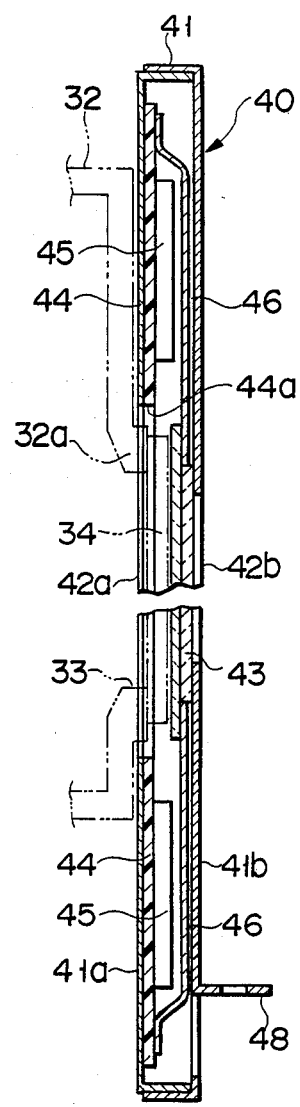

F I G. 7
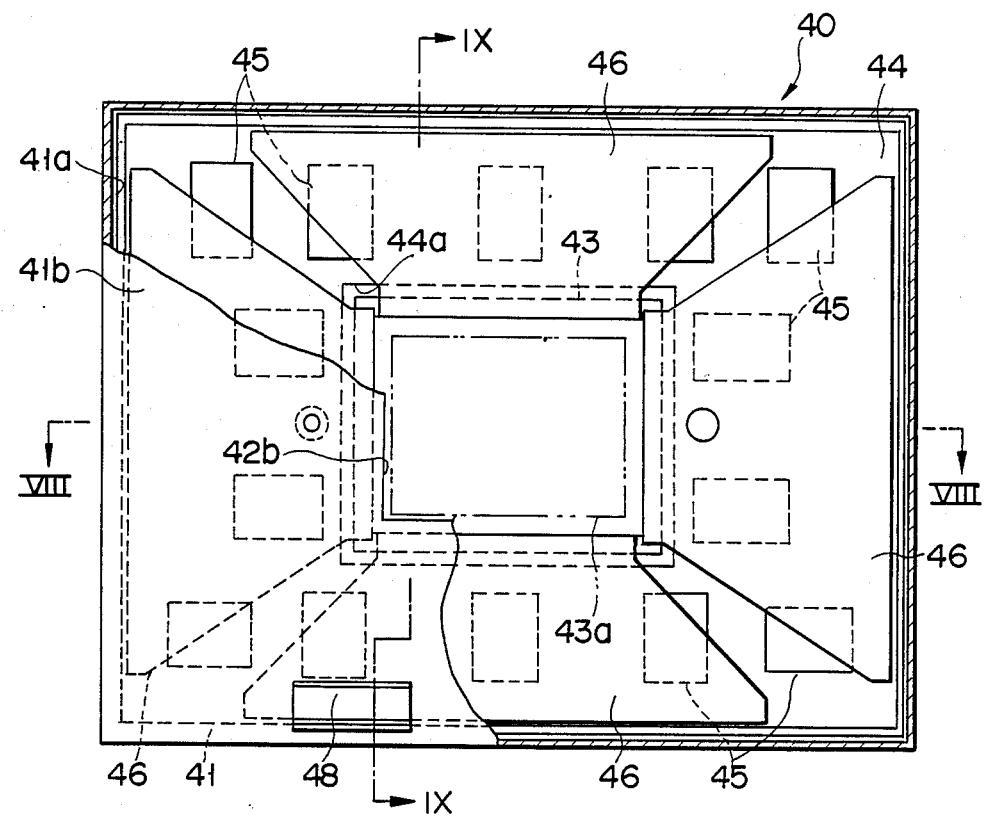

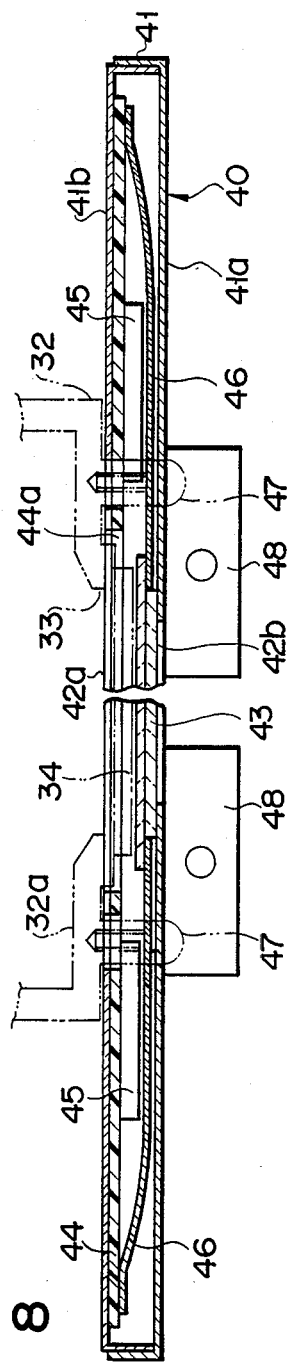
F I G. 8
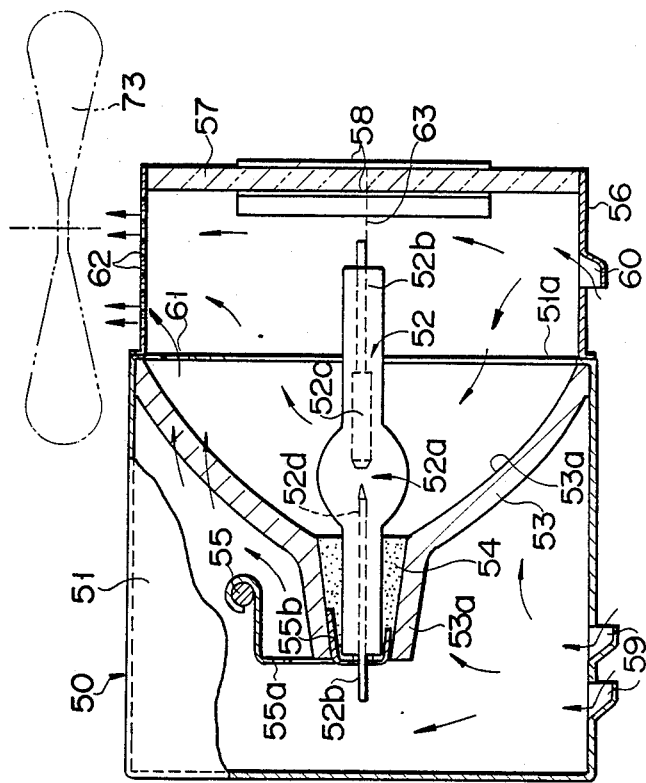
F I G. 10

PROJECTION DISPLAY APPARATUS

BACKGROUND OF THE INVENTION

The present invention relates to a projection display apparatus for enlarging a screen image, e.g., a television image, of an electro-optical display device.

U.S. Pat. Nos. 3,844,650 and 3,895,866 describe conventional apparatuses for enlarging and projecting images on the liquid crystal devices.

In these conventional apparatuses, a liquid crystal display device is irradiated with beams, and an image on the screen device is enlarged by a projection lens. The enlarged image is then projected on a screen.

However, a countermeasure against a temperature rise caused by high-intensity illumination light from a light source is not taken. When an image dynamically displayed on an electro-optical display device is enlarged and projected on a screen, the display device must be maintained within a predetermined temperature range, and short response time must be assured upon an application of electric energy.

In order to maintain the liquid crystal display device within the allowable operating temperature range, it is inconvenient to use a high-intensity beam. However, unless a high-voltage arc lamp such as a xenon lamp having a high intensity is used, good contrast of the display image to be projected on the screen cannot be obtained. This is apparent from the following considerations. A contrast ratio of the liquid crystal display device is very low as compared with an image printed on a film, and transmittance of the liquid crystal display device is a maximum of about 50%.

In a conventional projection display apparatus using an electro-optical display device, an indispensable technical issue for practical applications is the maintenance of the display device within the predetermined temperature range.

In order to enlarge and project a display image at a proper magnification (e.g., 20 to 30 times), image formation beams projected on the display device must be collimated beams. At the same time, it is also important not to display a shadow of a light-emitting portion of a lamp on the screen.

These problems are left unsolved in the conventional projection display apparatuses.

SUMMARY OF THE INVENTION

The present invention has been made in consideration of the above situation, and has as its object to provide a projection display apparatus for enlarging and projecting a dynamic display image visually observed by a display device having an electro-optical element.

It is another object of the present invention to provide a display apparatus wherein the electro-optical display panel irradiated with high-intensity light can always be controlled under good operating conditions.

It is still another object of the present invention to provide an apparatus wherein distortion of an image projected on the screen can be eliminated, and a shadow of a light-emitting portion in a lamp almost cannot be noticed on the screen.

It is still another object of the present invention to provide a low-cost projection display apparatus capable of enlarging and projecting a television image.

In order to achieve the above objects of the present invention, there is provided a projection display apparatus comprising:

light source means having a lamp with a light-emitting portion and a reflector for reflecting beams emitted from the lamp;

a display device for partially shielding the beams from the light source means upon an application of electrical energy;

a projection lens for enlarging an optical image incident from the display device and projecting an enlarged image on a screen;

a cooler arranged in contact with an outer surface of the display device, having a transparent portion opposing at least an image formation area of the display device, and having a heat radiator for radiating thermal energy internally stored upon reception of the beams from the light source means;

a cooling fan arranged between the light source means and the display device in a position deviated from an optical path; and a housing for cooling the thermal energy dissipated from the light source means and the cooler by external cooling air, the housing being provided with an exhaust port for exhausting hot air outside the apparatus by the cooling fan and with an intake port for receiving external air into the apparatus.

In the projection display apparatus according to the present invention, a projector case is partitioned into compartments of the light source and display device sides by a heat-insulating wall having a light transmission window through which illumination light passes from the light source to the display device. Therefore, the temperature rise of the display device can be reduced to improve contrast of the display image and prevent the liquid crystal from being destroyed by heat.

BRIEF DESCRIPTION OF THE DRAWINGS

FIG. 6 is a sectional view of the cooler shown in FIG. 4 taken along the line VI—VI thereof;

FIG. 7 is a partially cutaway front view of the display unit;

FIG. 8 is an enlarged sectional view of the display unit shown in FIG. 7 taken along the line VIII—VIII thereof;

FIG. 9 is an enlarged sectional view of the display unit shown in FIG. 7 taken along the line IX—IX thereof;

FIG. 10 is a longitudinal front view of a light source box;

DETAILED DESCRIPTION OF THE PREFERRED EMBODIMENTS

A projection display apparatus according to a first embodiment of the present invention will be described with reference to FIGS. 1 to 13.

Figure 1:
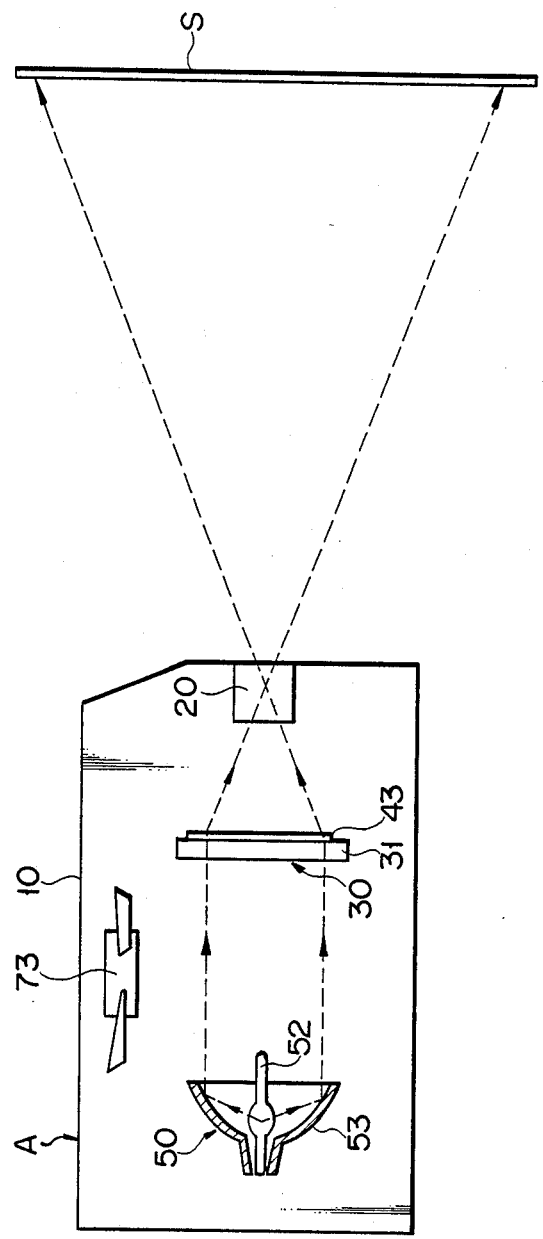
FIG. 1 is a schematic sectional view showing the overall arrangement of a projection screen apparatus according to a first embodiment of the present invention.

Referring to FIG. 1, apparatus A comprises projection lens 20 arranged in the front surface of housing 10. Lens 20 comprises a lens barrel having a plurality of lenses (not shown). Display unit 30 is arranged in the front portion of housing 10, and light source unit 50 is arranged in the rear portion thereof. Unit 30 comprises transmission electro-optical display device 43 and cooler 31 arranged in direct contact with the surface of display device 43 on the opposite side of light source unit 50. Cooler 31 absorbs beams emitted from light source unit 50 to display device 43 to reduce heat components emitted onto display device 43. At the same time cooler 31 absorbs heat from display device 43, thereby reducing a temperature rise of display device 43.

Housing 10 also includes blower fan 73 located between light source unit 50 and display unit 30 at a position deviated from the optical path. Fan 73 exhausts warm air heated by beams emitted from light source unit 50 and supplies external cool air into housing 10, thereby preventing the interior of housing 10 from being heated to a high temperature.

Collimated beams are emitted from light source unit 50 and pass through display unit 30 to form an optical image. The optical image is enlarged and projected by projection lens 20 onto screen S. Lens 20 rotates the original image by 180 degrees.

Projection display apparatus A will be described with reference to FIG. 2 and the subsequent drawings.

Light narrowing Fresnel lens 21 and beam correcting Fresnel lens 22 are arranged between light source unit 50 and display unit 30 in housing 10. Lens 21 narrows illumination light from light source unit 50 to increase its intensity. Lens 22 corrects the narrowed light from lens 21 into light parallel to optical axis 0 of apparatus A. Lenses 21 and 22 are made of a transparent synthetic resin such as acrylic resin and respectively serve as a condenser lens and a relay lens. Lenses 21 and 22 may comprise so-called linear Fresnel lenses each having parallel lens portions to constitute a lens surface, or so-called concentric circular Fresnel lenses. Focusing Fresnel lens 23 is arranged on the front surface (on the side of projection lens 20) of display unit 30 to focus the light transmitted through display device 43, i.e., the image displayed on display device 43 on projection lens 20. Lens 21 is located near light source unit 50, lens 22 is located near the rear surface of display unit 30, and lens 23 is located near the front surface of display unit 30.

Figure 4:
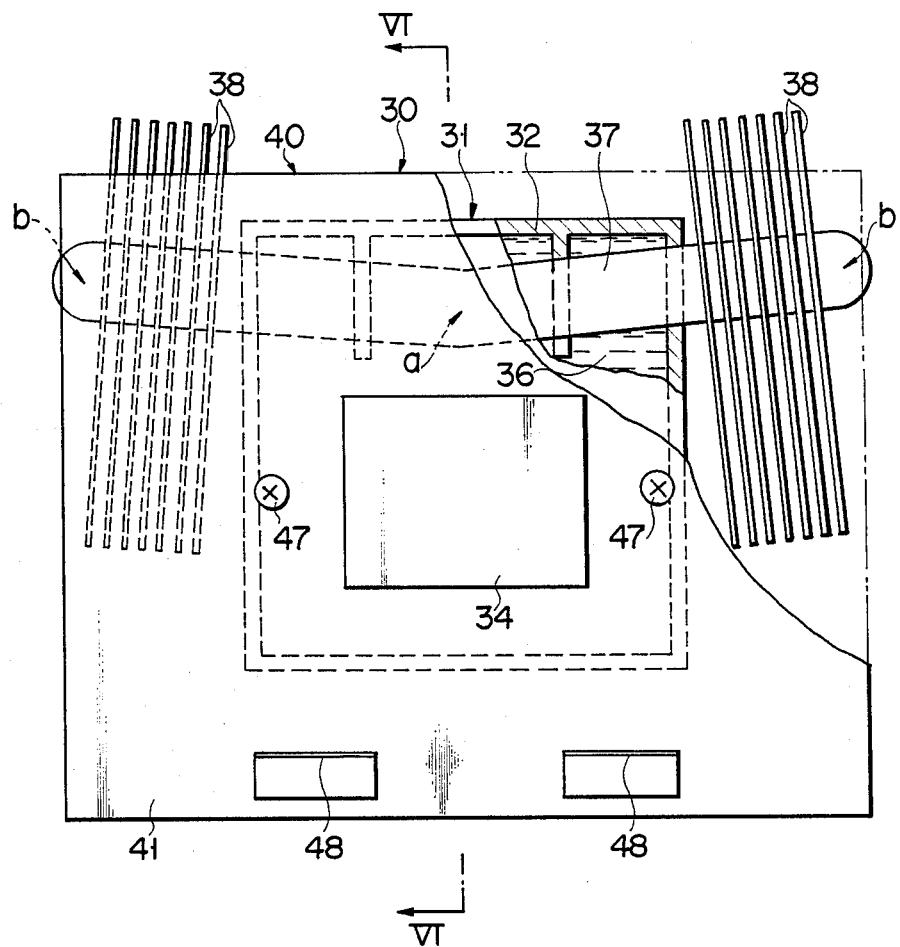
FIG. 4 is a front view of a cooler constituting a display unit.
Figure 5:
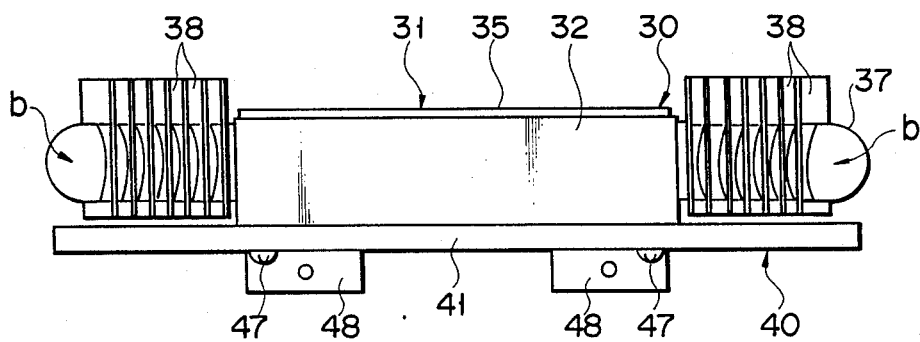
FIG. 5 is a plan view of the cooler.

FIGS. 4 to 6 show display unit 30. Unit 30 comprises display device cooler 31 and display panel 40 attached to one surface of cooler 31.

Cooler 31 is prepared such that transparent coolant 36 such as an aqueous solution of ethylene glycol is filled in a thin box-like cooling vessel having a transparent window with an area larger than display area 43a (FIG. 7) of device 43. The cooling vessel has a sealed structure comprising frame 32 sufficiently larger than display device 43 and transparent plates (glass or acrylic plates) 34 and 35 which seal the both surfaces of frame 32. Frame 32 has display panel mounting portion 32a (FIG. 7) on its one surface. Mounting portion 32a has window 33 having an area slightly larger than that of display area 43a of device 43. Transparent plate 34 for sealing one surface of frame 32 has a size enough to cover window 33 and is adhered to mounting portion 32a. Transparent plate 35 for sealing the other surface of frame 32 has substantially the same size as that of frame 32 and is adhered to the other surface of frame 32.

Reference numeral 37 denotes a heat pipe inserted in cooler 31 of display unit 30 so as not to interfere the optical path of window 33. Pipe 37 is inserted in the upper portion of cooling vessel such that both ends of pipe 37 extend outside the cooling vessel. Pipe 37 serves to dissipate heat absorbed by coolant 36 in cooler 31 to the external atmosphere. The central portion of heat pipe 37 inserted in the cooling vessel serves as heat-absorbing portion a. Heat radiation portions b are constituted by the heat pipe portions extending outside the cooling vessel. Heat radiation fins 38 of vertical stripes having a large area are mounted on the outer surfaces of heat radiation portions b. A volatile working fluid (a heat conduction medium) is sealed in a metal pipe, the both ends of which are closed. Asbestine wick 37a is present in the entire interior area of heat pipe 37 to conduct heat from heat radiation portions b to heat-absorbing portion a by a capillary phenomenon of the working fluid therein. The working fluid conducts heat by reversible phase transformation from evaporation to condensation and vice versa. The working fluid comprises a fluid such as fron having a high latent heat coefficient and high permeability. The working fluid is evaporated by heat exchange with coolant 36 in cooler 31 in heat-absorbing portion a of heat pipe 37. The vapor rises through pipe 37 and is condensed and liquefied by heat radiation at heat radiation portions b of pipe 37. The working fluid as a liquid is permeated in wick 37a and is guided to heat-absorbing portion a by the capillary phenomenon. The central portion of pipe 37 has the lowest level and the end portions are inclined upward to guide the working fluid evaporated in heat-absorbing portion a to heat radiation portions b and to guide the working fluid liquefied in heat radiation portions b and permeated in wick 37a to heat-absorbing portion a again.

Referring to FIGS. 7 to 9, display panel 40 mounted on one surface of cooler 31 is arranged such that display device 43 and display driver circuit board 44 are accommodated in thin case-like box 41 having light transmission windows 42a and 42b corresponding to display device 43.

Reference numerals 41a and 41b denote a pair of metal cases for forming box 41. Cases 41a and 41b have openings serving as windows 42a and 42b, respectively. Window 42a on the cooler mounting side has a size enough to receive transparent plate 34 adhered to display panel mounting portion 32a of cooler 31. Window 42b has substantially the same size as that of display area 43a of display device 43. Circuit board 44 has central opening 44a having substantially the same size as that of window 42a. A large number of display driver LSI chips 45 are mounted on circuit board 44 so as to surround opening 44a. Chips 45 are mounted on circuit board 44 by wire soldering (not shown). Circuit board 44 is adhered on a two-side adhesive sheet (not shown) adhered to the inner surface of metal case 41a on the cooler mounting surface side of box 41. Display device 43 comprises a transmission dot-matrix liquid crystal display panel for displaying a television image. Transparent conductive stripes are formed on the inner surfaces of a pair of transparent glass substrates in directions perpendicular to each other. A twisted nematic field effect liquid crystal is sealed between the opposite surfaces of the pair of transparent glass substrates. Polarizing plates are formed on the outer surfaces of the glass substrates such that the polarizing directions thereof are aligned with each other. Display device 43 is connected to circuit board 44 through a large number of display device connecting terminals (not shown) formed at the edge of circuit board 44 and sheet-like flexible connectors 46. Display device 43 is located in housing 41 to oppose light-transmitting windows 42a and 42b of the housing. Display device 43 is adhered to the inner surface of box 41 through a frame-like two-side adhesive sheet (not shown).

Display device 43 is in contact with transparent plate 34 adhered to display panel mounting portion 32a 31 and is fixed to display panel mounting portion 32a of cooler 31 by screws 47.

Figure 2:
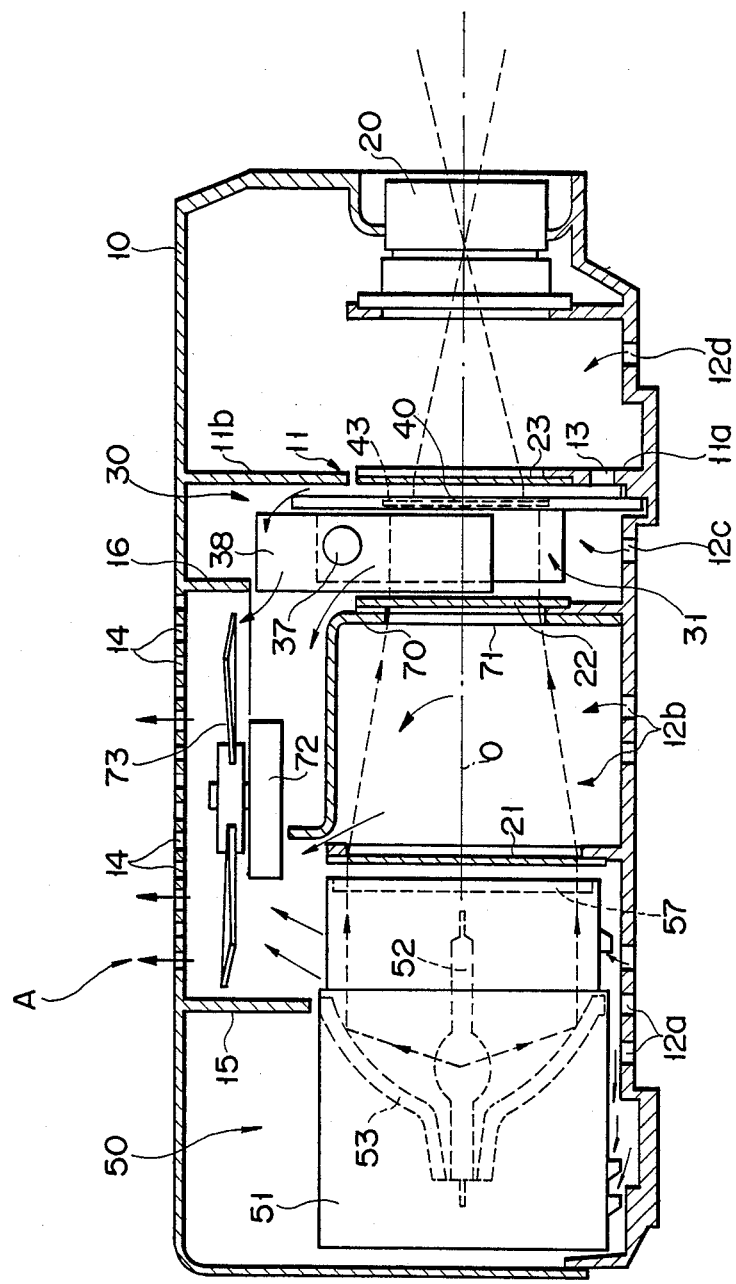
FIG. 2 is a longitudinal sectional view of the apparatus shown in FIG. 1.
Figure 3:
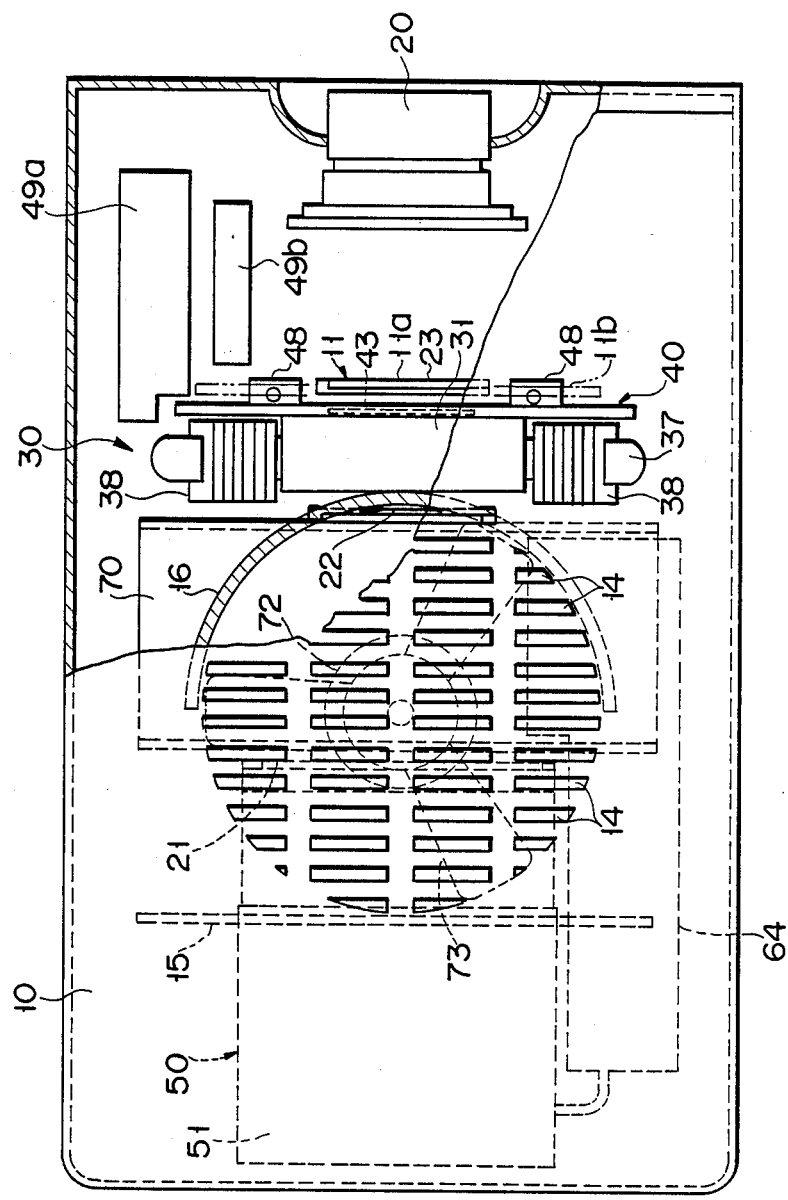
FIG. 3 is a partially cutaway plan view of the apparatus shown in FIG. 1.

Display unit 30 having display device cooler 31 mounted with display unit 40 is arranged in housing 10 such that display panel 40 is directed toward projection lens 20 and that cooler 31 is directed toward light source unit 50, as shown in FIGS. 1 to 3. Display unit 30 is fixed such that mounting plate 48 of panel 40 is screwed on the inner bottom surface of housing 10 (FIG. 2). Reference numeral 49a in FIG. 3 denotes a linear circuit unit for processing a television signal received by an antenna (not shown) and a tuner (not shown) arranged in housing 10 and for generating an image signal and sync signals. Reference numeral 49b denotes an image display control circuit unit for driving and controlling display device 43 in response to the sync signals from unit 49a. Circuit board 44 in display panel 40 is connected to control circuit unit 49b through a connecting cable (not shown).

Figure 11:
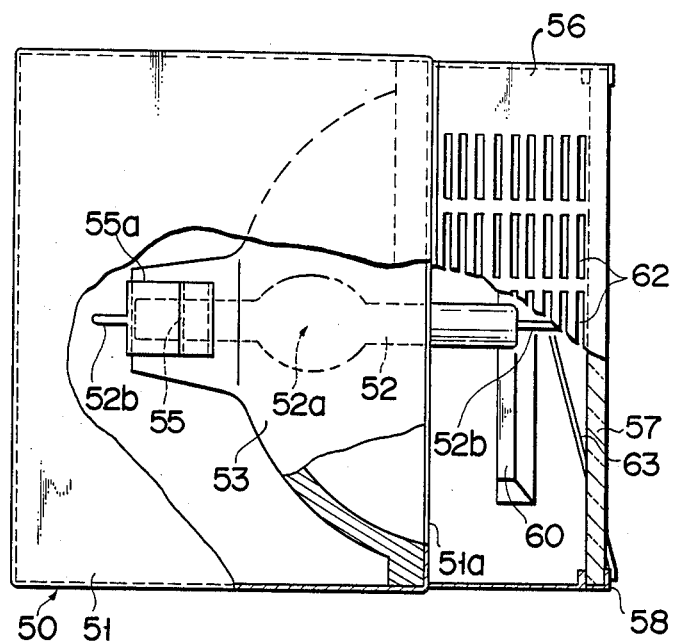
FIG. 11 is a partially cutaway plan view of the light source box.
Figure 12:
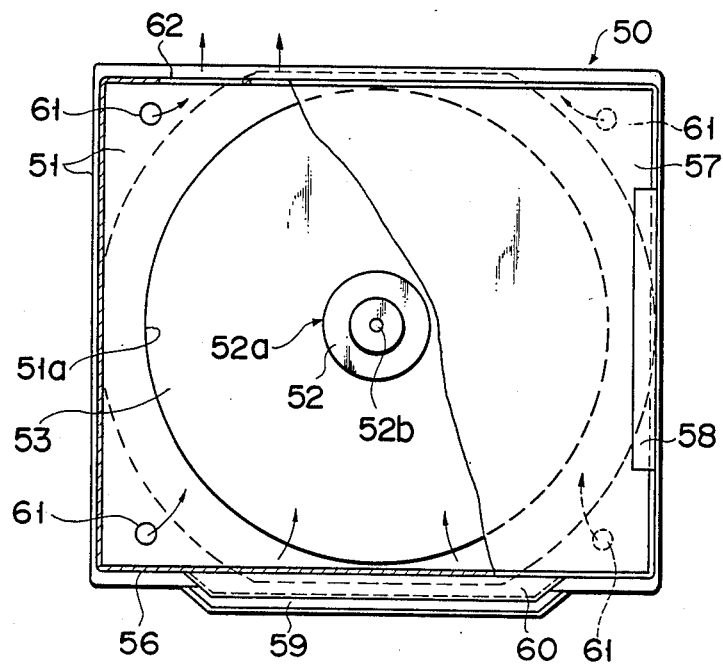
FIG. 12 is a partially cutaway side view of the light source box.

Light source unit 5 will be described with reference to FIGS. 10 to 12. Reference numeral 51 denotes a light source box made of metal plates and having circular opening 51a on the front surface. High-voltage ar lamp 52 and parabolic reflector 53 for directing illumination light from lamp 52 to display device 43 are arranged in box 51. The opening surface of reflector 53 opposes opening 51a of the front surface of light source box 51. Cylindrical neck 53a extends backward from the center of the proximal end of reflector 53. A metal piece of the rear end portion of lamp 52 is inserted in neck 53a, and the optical axis of the lamp is aligned with the focal point of reflector 53. Lamp 52 is mounted in the reflector 53. Lamp 52 is fixed to reflector 53 by ceramic adhesive 54 filled in neck 53a. Reference numeral 55a denotes a magnet support member made of a metal plate for supporting arc stabilizing magnet 55 on its upper end portion. U-shaped anchor 55b to be inserted in neck 53a is formed at the proximal end of support member 55a.

Anchor 55b at the proximal portion of support member 52 is inserted in neck 53a of reflector 53 from the rear end portion of anchor 55b and is fixed to reflector 53 by ceramic adhesive 54.

Anode 52c and cathode 52d oppose each other in lamp 52. When a high voltage is applied across anode 52c and cathode 52d, a discharge arc is generated by light-emitting portion 52a (i.e., a gap between the electrodes). Parts of anode 52c and cathode 52d are led as thin connecting terminals 52b outside the lamp. Surfaces of thin stripe-like connecting terminals 52b are parallel to the axis of the focal point of reflector 53. Metal film 63 is connected to the connecting terminal of anode 52c. In this case, the surface of the connecting terminal is parallel to the axis of the focal point of reflector 53.

If power consumption of high-voltage arc lamp 52 is set to be about 350 watts, a current of 16 ampere and a voltage of about 22 volt are supplied to anode 52c of metal film 63. In this case, the thickness of the metal film is sufficiently 0.15 mm, its width is 2 mm, and its length is 80 mm. Lamp 52 is fixed such that light-emitting portion 52a coincides with the focal point of reflector 53. Beams emitted from light-emitting portion 52a to reflector 53 are reflected in a direction parallel to the axis of the focal point of reflector 53.

Unlike in the case of FIGS. 10 and 1,, for example, when lamp 52 is arranged in a direction perpendicular to the axis of the focal point of reflector 53, beams reflected at different angles are mixed in due to a distance in light-emitting portion 52a, i.e., the gap between anode 52c and cathode 52d. In this case, a shadow is formed in the image projected on the screen. In addition, a shadow of the connecting member is also formed in the projected image in a conventional arrangement. However, according to this embodiment, anode 52c and cathode 52d are arranged on the axis of the focal point of reflector 53, and metal film 63 is used as the connecting member to solve the above conventional problem.

The mounting structures of high-voltage arc lamp 52 and arc stabilizing magnet 55 can be greatly simplified as compared with the conventional ones.

Reference numeral 56 denotes a protective cylinder made of a metal plate and having a rectangular cross section. Cylinder 56 is mounted on the front surface of light source box 51 to extend therefrom. Transparent protective glass plate 57 is fitted in the front end portion of cylinder 56 to cover the opening of cylinder 56 and is clamped and fixed by bent pieces 58 formed at both side surfaces of cylinder 56. Cylinder 56 and glass plate 57 are arranged to protect the components of apparatus A from scattering pieces (glass pieces) when lamp 52 is overheated and destroyed. Reinforced glass plate 57 comprises, for example, a 5-mm thick chemically reinforced blue glass plate. Intake ports 59 and 60 are formed on the lower surfaces of light source box 51 and protective cylinder 56. Vent holes 61 are formed at the four corners of the front surface of box 51 to cause box 51 to communicate with cylinder 56 outside reflector 53. At the same time, exhaust holes 62 are formed on the upper surface of cylinder 56. Ports 59 and 60 and holes 61 and 62 are formed to cool light source unit 50 with air. Cool air supplied from intake port 59 on the lower surface into box 51 cools the outer surface of reflector 53 through box 51, as indicated by the arrow in FIG. 10. Air is then supplied to protective cylinder 56 through vent holes 61 and is exhausted from exhaust holes 62. Cool air received from intake port 60 on the lower surface into cylinder 56 cools the inner surfaces of reflector 53 and glass plate 57 and is exhausted from exhaust holes 62.

Light source unit 50 is arranged in the rear portion of housing 10, as shown in FIGS. 1 to 3. Unit 50 is connected to power source unit 64 (FIG. 3) located on the side thereof. Light source unit 50 is replaced together with box 51 and protective cylinder 56 when high-voltage arc lamp 52 is destroyed. Unit 50 is detachably fixed by screws or the like in housing 10.

Referring back to FIGS. 2 and 3, reference numeral 70 denotes a heat-insulating wall formed in housing 10. Wall 70 comprises a vertical wall portion for partitioning the housing into compartments on the sides of display unit 30 and light source unit 50, and an upper wall portion extending from the upper end of the vertical wall portion to a portion near light source unit 50. Opening 71 is formed in the vertical wall portion to cause light from light source unit 50 to pass through. Housing 10 also includes lower portion partition wall 11a extending vertically from the bottom of the case and upper portion partition wall 11b suspending from the upper surface of the case, near the front surface of display unit 30. Wall 11a also serves as a support frame for Fresnel lens 23 arranged on the front surface of display unit 30. Lens 23 is adhered to wall 11a. Wall 11b has a height enough to cause its lower end to come in contact with or near the upper edge of lens 23. Wall 11b, lens 23, and wall 11a constitute flow control wall 11 for causing cool air to flow along the front surface of display panel 40.

Intake holes 12a, 12b, 12c, and 12d are formed in the lower surface of housing 10 at positions corresponding to the mounting portion of light source unit 50, a portion between light source unit 50 and display unit 30, a mounting portion of display unit 30, and a portion in front of wall 11, respectively. Vent hole 13 is formed in the lower portion (i.e., a portion of wall 11a below Fresnel lens 23) of wall 11 to guide air from hole 12d into an air passage between wall 11 and panel 40. Blowing fan 73 is arranged in the upper portion of housing 10 and is located above the upper wall portion of heat-insulating wall 70. Fan 73 is designed to be rotated by motor 72. Exhaust holes 14 are formed in the upper surface of housing 10.

Blowing fan 73 receives external air into housing 10 through intake holes 12a to 12d in a direction indicated by an arrow in FIG. 2 to cool the interior of apparatus A. Cool air received from hole 12a cools light source 50 since it passe therethrough. Cool air supplied from hole 12b passes through the area between light source unit 50 and display unit 30 to lower the temperature in the case and at the same time to cool Fresnel lenses 21 and 22. Cool air supplied from hole 12c externally cools display unit 30 and coolant 36 in display panel cooler 31 by heat exchange with heat pipe 37. Cool air received from hole 12d is supplied to the area between flow control wall 11 and display panel 40 through vent hole 13 formed in the lower portion of wall 11 to cool panel 40 from its front surface and at the same time to cool Fresnel lens 23. Air used for cooling the components is exhausted from exhaust holes 14. Air supplied from hole 12b and fed between light source unit 50 and screen unit 30 bypasses the distal end and both sides of the upper wall portion of heat-insulating wall 70. The bypassed air is also exhausted from exhaust holes 14. Reference numerals 15 and 16 in FIGS. 2 and 3 denote air guide walls. Wall 15 on the side of light source unit 50 is a vertical straight wall extending along the widthwise direction of the case, and wall 16 on the display unit 30 comprises a semicircular wall.

In the liquid crystal projector of this embodiment, transparent coolant 36 (FIG. 6) is filled in vessel 31 having transparent portions each larger than the display area of display device 43. Display panel 40 (FIG. 8) incorporating display device 43 and circuit board 44 therein is mounted on surface of cooler 31 inserted with heat pipe 37 for dissipating heat absorbed by coolant 36. At the same time, focusing Fresnel lens 23 is arranged at the portion of the other surface of panel 40 at a position opposite to display panel 43, so that transparent flow control wall 11 opposes display panel 40, thereby constituting a path of cool air supplied by fan 73 to the upper portion between wall 11 and panel 10. A temperature rise of display device 43 by radiation heat from light source unit 50 can be reduced to prevent degradation of display contrast and shortening of the service life of the liquid crystal.

Figure 13:
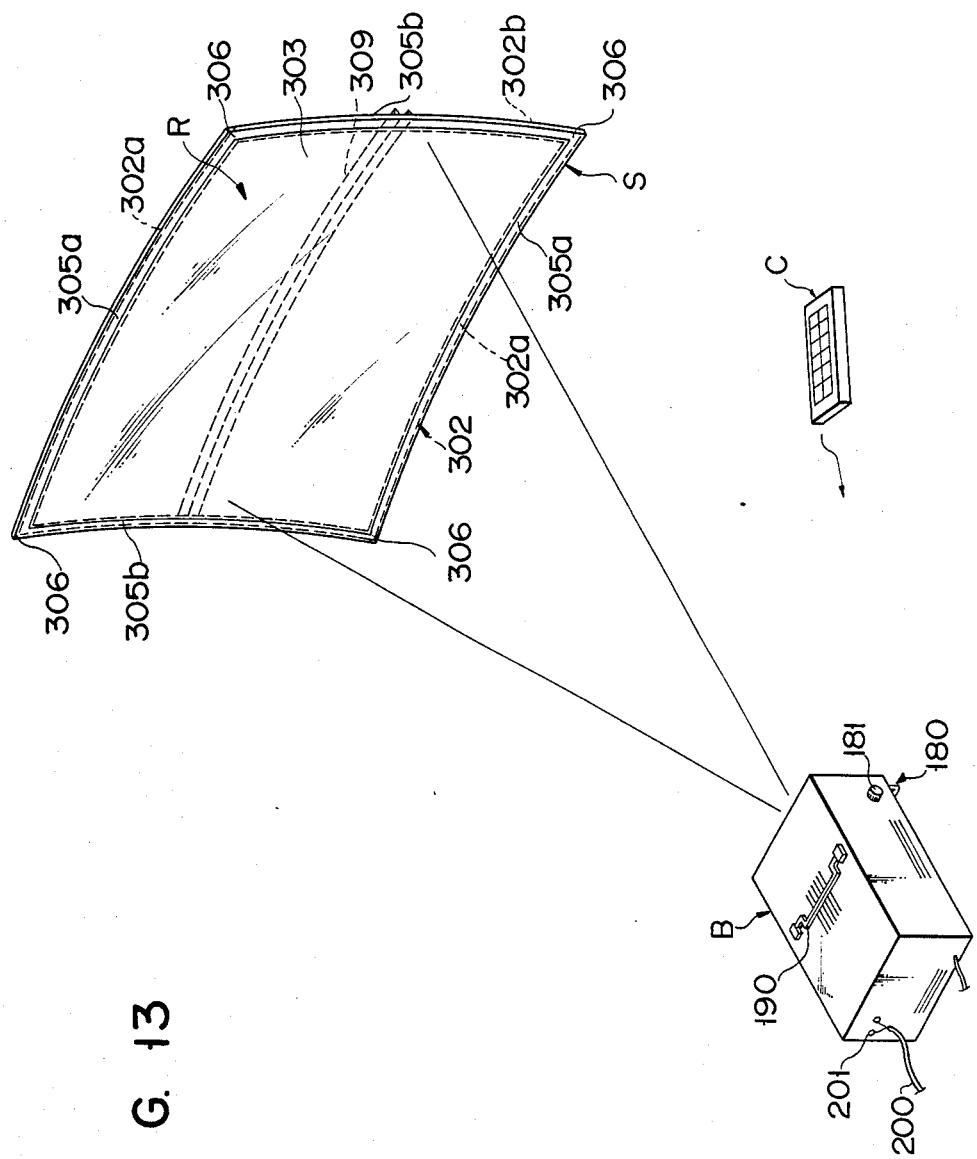
FIG. 13 is a view showing the overall configuration of a television image projection system according to a second embodiment of the present invention.

A projection display apparatus according to a second embodiment of the present invention will be described below Reference symbol B in FIG. 13 denotes a television image projection apparatus for projecting a television image on screen S, wherein antenna feeder line 200 is connected to antenna terminal 201. Apparatus A includes lift mechanism 180 for controlling a tilt angle of apparatus housing B, and handle 190 for carrying the apparatus. ON/OFF operation of apparatus B is controlled by remote controller C, and controller C selects a TV program channel. Screen S has a spherical shape, so that an image projected on screen S is not distorted in four directions of screen S regardless of the distance from a projection lens.

Figure 14:
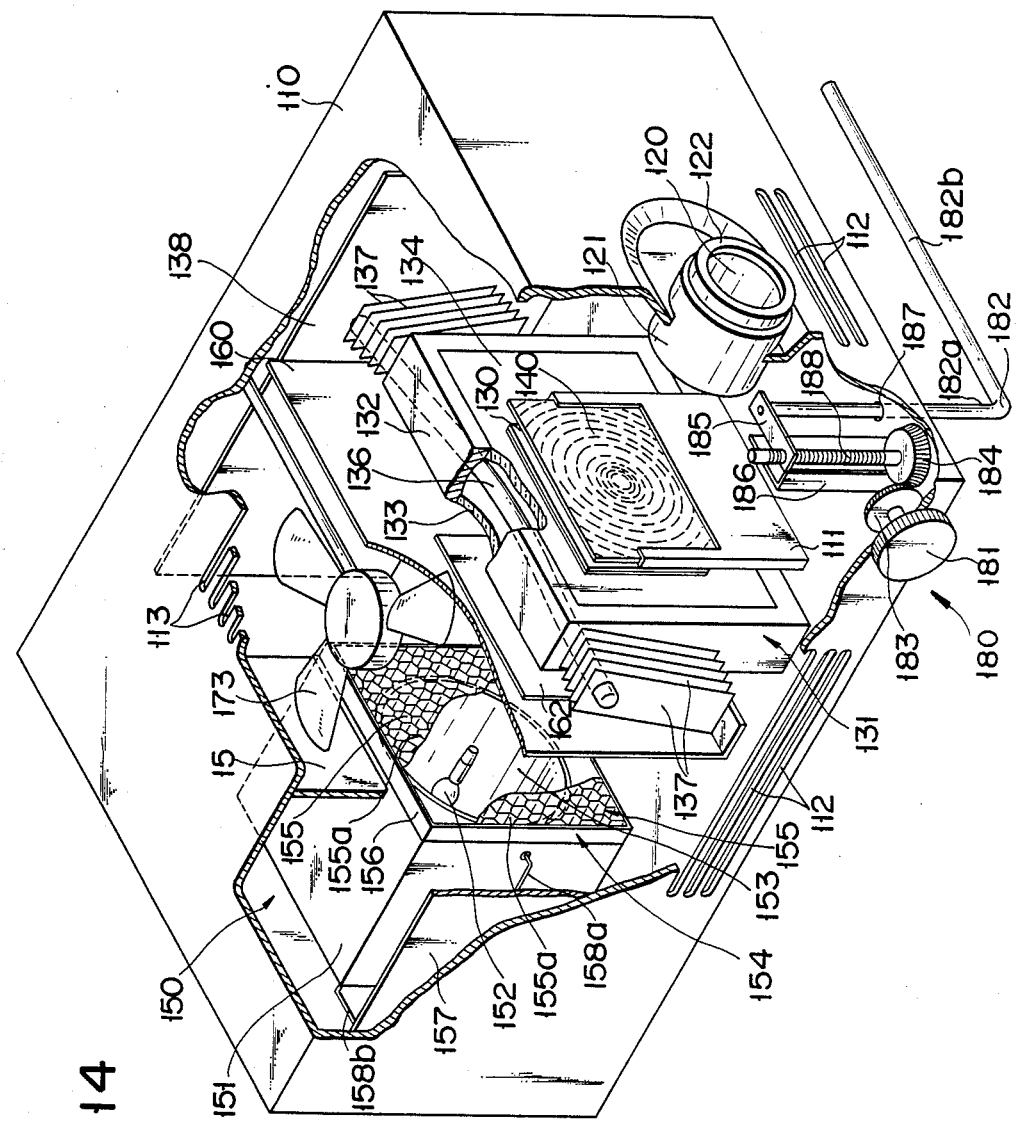
FIG. 14 is a partially cutaway perspective view of a television image projection apparatus according to the second embodiment.
Figure 15:
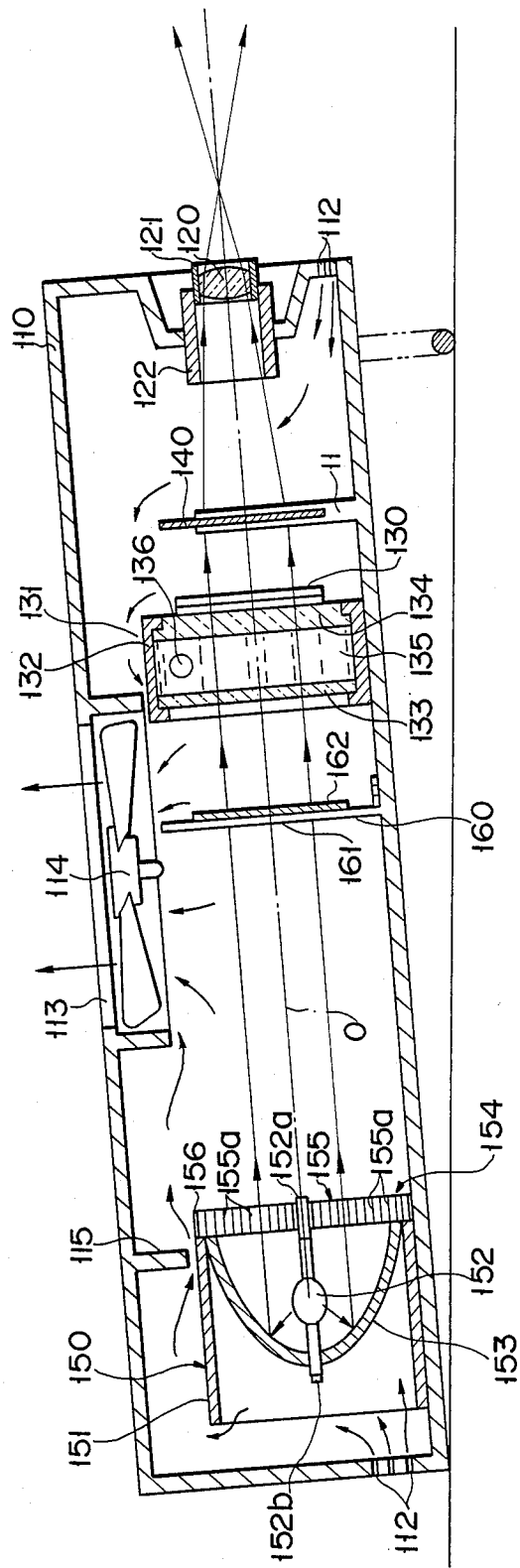
FIG. 15 is a longitudinal sectional view of the apparatus shown, in FIG. 13.

Projection apparatus B will be described in detail. Referring to FIGS. 14 and 15, reference numeral 110 denotes a housing of television image projection apparatus B. Projection lens 120 is mounted on the front surface of housing 110. Lens 120 is arranged in lens barrel 122 threadably engaged with cylinder 121 extending through the front surface of housing 110. Barrel 122 is turned to focus an image on screen S according to a position of screen S. A displacement of the screen indicates a change in magnification of the projected image. In this sensor, projection lens 120 can control an image magnification. Reference numeral 130 denotes a transmission type dot-matrix liquid crystal display device arranged vertically to oppose projection lens 120 in the front portion of housing 110 so as to display a television image.

Figure 16:
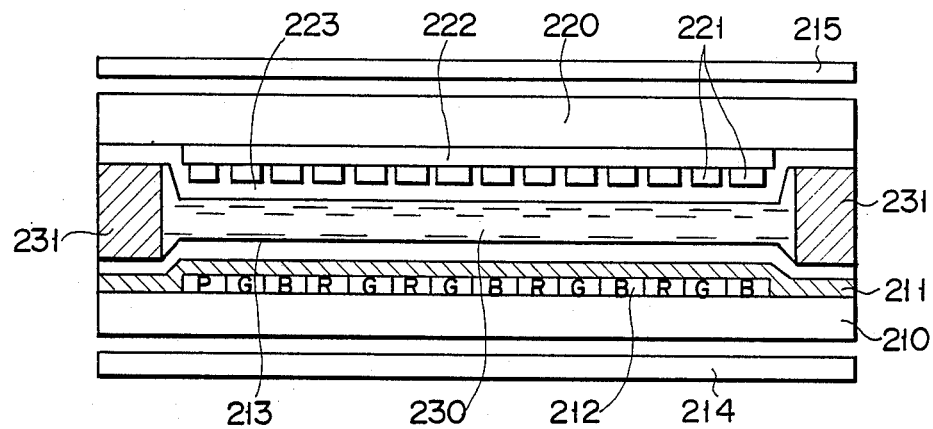
FIG. 16 is a sectional view of a color display liquid crystal display device according to the second embodiment.

As shown in FIG. 16, display device 130 comprises an active matrix type full-color liquid crystal display device. Red, green, and blue color filter stripes 212 are formed on one glass substrate 210 having scanning electrodes 211 thereon. Thin-film transistors 222 are formed on the other glass substrate in a direction perpendicular to scanning electrodes 211. Twisted nematic liquid crystal element 230 is sealed between electrodes 211 and 221 by means of sealing members 231.

The major axis of liquid crystal elements 230 are rotated by orientation films 213 and 223 formed on scanning and display electrodes 211 and 221. The molecules are twisted through 90 degrees. At the same time, polarizing plates 214 and 215 are formed on outer surfaces of glass substrates 210 and 220. The polarizing directions of plates 214 and 215 are aligned with each other. When a liquid crystal drive voltage is not applied between electrodes 211 and 221, light is not transmitted through the display device. However, in a portion applied with the voltage between electrodes 211 and 221, twisting of the molecules is disturbed, and light is transmitted through the display device. Upon selective ON-/OFF operation of thin-film transistors 222, a voltage is applied to the corresponding display electrode 221, and a mixture of beams passing through red, green, and blue color filter stripes 212 allows full-color display. This display device itself is known to those skilled in the art.

Display device 130 is mounted on display device cooler 131 (the structure will be described later) vertically mounted in housing 110. Reference numeral 140 denotes a focusing Fresnel lens arranged between display device 130 and projection lens 120. Lens 140 focuses an image displayed on display device 130 onto projection lens 120. Lens 140 comprises a circular Fresnel lens having a large number of concentric convex lenses on the entire surface of a transparent plate such as an acrylic plate. Lens 140 is held in lens holder 11 arranged in housing 110. Reference numeral 150 denotes a light source unit arranged in the rear portion of housing 110. Illumination light from light source unit 150 passes through cooler 131 and is incident on the lower surface of display device 130. Light passing through display device 130, that is, a display image from display device 130 is focused by lens 140 onto lens 120. The image is then enlarged and projected by lens 120 on the screen.

Display device cooler 131 cools display device 130 heated by a temperature rise of housing 110 caused by radiation heat from light source unit 150. Cooler 131 is prepared such that transparent coolant 135 such as an aqueous solution of ethylene glycol is filled in a sealed cooling vessel. The vessel is obtained such that both surfaces of vertical frame 132 having a larger size than device 130 are closed by transparent plates 133 and 134 such as glass plates. Display device 130 is brought into contact with the outer surface transparent plate 134 on the projection lens side and is adhered by an adhesive or the like. Reference numeral 136 denotes a cooling pipe arranged in cooler 131 so as not to interfere with a portion corresponding to display device 130. Pipe 136 is inserted in the upper portion of the cooling vessel such that end portions of pipe 136 extend outside therefrom. Cooling pipe 136 dissipates heat absorbed by coolant 135 filled in cooler 131. The central portion of pipe 136 inserted in cooler 131 serves as a heat-absorbing portion, and the end portions exposed outside the cooling vessel serve as heat radiation portions. A plurality of radiation fins 137 of vertical stripe-like members having a large area are formed on each heat radiation portion. Fins 137 are formed along a direction perpendicular to the surface of device 130 so as to effectively guide the exhaust air supplied in housing 110 and used for cooling display device 130. At the same time, fins 137 are inclined inward (the widthwise direction of device 130) from the lower end side to the upper end side and are parallel to each other. Both ends of pipe 136 are closed and evacuated, and a small amount of working fluid (a heat conduction medium) is sealed in the sealed metal pipe in the same manner as in the first embodiment. An asbestine wick is formed on the entire inner surface of pipe 136 to guide the working fluid from the heat radiation portions to the heat absorbing portion by the capillary phenomenon. The working fluid conducts heat by reversible two-phase transformation of evaporation and condensation. The working fluid comprises a fluid (e.g., fron) having a high latent heat coefficient and good permeability. The working fluid is heated and evaporated by heat exchange with cooling medium 135 at the heat absorbing portion of pipe 136 in cooler 131. The vapor rises within pipe 136 and is condensed and liquefied by heat radiation at the heat radiation portions. The working fluid liquefied upon removal of latent heat is permeated in the wick and is guided again to the heat-absorbing portion by the capillary phenomenon. The central portion of pipe 136 has the lowest level and the end portions thereof are inclined upward to guide the working fluid evaporated in the heat-absorbing portion to the end heat radiation portions, and to guide the working fluid liquefied in the heat radiation portions and permeated in the wick to the heat-absorbing portion. Cooler 131 is cooled by internal coolant 135. Display device 130 fixed on cooler 131 is forcibly cooled. Heat absorbed by coolant 135 is radiated by heat radiation fins 137 formed on the outer surfaces of heat radiation portions of pipe 136. Therefore, coolant 135 is always maintained at a low temperature.

Referring to FIG. 14, reference numeral 138 denotes a main circuit board mounted on one side of housing 110. Circuit board 138 comprises a linear circuit unit for processing a television wave received by an antenna (not shown) and for generating an image signal and sync signals and a display driver unit for driving display device 130 in synchronism with the sync signals from the linear circuit unit. Display device 130 is connected to a sheet-like flexible connector (not shown) to the display driver unit mounted on circuit board 138.

Slit-like intake holes 112 are formed on lower edges of the front and rear surfaces and both side surfaces of housing 110 to receive external air into housing 110. A plurality of slit-like exhaust holes 113 are formed at the central portion of the upper surface of housing 110. Blowing fan 173 is arranged in the upper portion of housing 110 at a position below holes 113. Fan 173 supplies the external air into housing 110 through holes 112 and exhausts air from holes 113. Cool air supplied from holes 112 on the front surface and both side surfaces of housing 110 is supplied in housing 110 to cool focusing Fresnel lens 140, display device 130 and main circuit board 138. At the same time, air is subjected to heat exchange with fins 137 of cooler 131 and is then exhausted from holes 113. Air supplied from holes 112 on the rear surface of housing 110 to housing 110 cools light source unit 150 from the rear surface and flows forward in the space formed between the outer surface of light source unit 150 and partition wall 115 formed in housing 110. This air is exhausted from holes 113 together with cool air supplied from holes 112 on the both side surfaces of housing 110 to cool light source unit 150 from its front surface.

Heat-insulating wall 160 is vertically arranged near display device cooler 131 between light source unit 150 and display device cooler 131. Wall 160 is arranged to reduce heating of cooler 131 and device 130 by radiation heat from light source unit 150. Opening 161 is formed in wall 160 to transmit illumination light from light source unit 150 therethrough. Transparent plate 162 comprising an infrared absorption filter or heat-resistive glass plate is fitted in opening 161.

Lift mechanism 180 arranged on the side of projection lens 120 in television image projection apparatus B to control the tilt angle of apparatus B will be described.

Referring to FIG. 14, reference numeral 182 denotes a stand for supporting apparatus B obliquely upward. Stand 182 is disposed at the front end of housing 110.

Stand height control knob 181 arranged on the outer surface of housing 110 is turned to vertically move stand 182 through screw shaft 188 vertically disposed in housing 110. Shaft 188 is rotated through gears 183 and 184 upon rotation of knob 181. Reference numeral 185 denotes a movable member meshed with shaft 188 and vertically moved upon rotation of shaft 188. Movable member 185 can be vertically moved and guided along guide plate 186 vertically disposed in housing 110. Stand 182 comprises a single round steel rod having leg 182b extending below the bottom surface of housing at the lower end of vertical portion 182a parallel to shaft 188. Leg 182b extends through the center of gravity of apparatus B along the widthwise direction of housing 110. Leg 182b can be stably placed on a base such as a table. Stand 182 is fixed to movable member 185 at the upper end of vertical portion 182a. Stand 182 can be vertically moved together with movable member 185 while stand 182 is guided by stand insertion hole 187 formed in the bottom surface of housing 110.

Light source unit 150 will be described in detail below. Unit 150 comprises lamp 152 and reflector 15 for reflecting illumination light from lamp 152 forward toward box 151 and hence display device 130. Lamp 152 and reflector 153 are housed in box 151. Reflector 153 comprises a parabolic reflector for reflecting illumination light from lamp 152 as collimated light parallel to optical axis 0 thereof. Reflector 153 is fixed by screws in light source box 151. Lamp 152 comprises a high-voltage arc lamp such as a xenon lamp having a high intensity. The proximal portion of lamp 152 is inserted in the neck of reflector 153 such that the light-emitting portion (i.e., an arc generation portion) is aligned with the focal point of reflector 153. In this manner, lamp 152 is supported by reflector 153.

Figure 17:
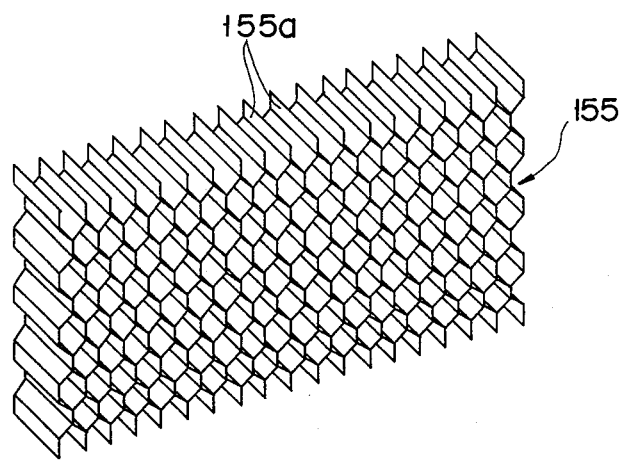
FIG. 17 is a perspective view of a honeycomb core shown in FIG. 14.

Reference numeral 154 denotes an electromagnetic shielding member mounted on the front surface of box 151. Shielding member 154 comprises a rough mesh. More specifically, shielding member 154 comprises honeycomb core 155 and conductive frame 156 for supporting core 155. Core 155 comprises very thin metal films (e.g., aluminum films) 155a each having a thickness of 25 $\mu$m to 75 $\mu$m, as shown in FIG. 17. Core 155 is prepared by laminating a very thin metal film tape having a predetermined width (e.g., about 5 to 10 mm), by adhering the adjacent metal films at predetermined intervals along the entire length, and by pulling the metal films in a direction where they are separated from each other, in the same manner as the conventional method of manufacturing a honeycomb core. Surfaces of metal films 155a are parallel to the direction (optical axis 0) of light reflected by reflector 153. Lamp 152 is arranged such that its anode is directed toward reflector 153. Anode terminal 152a of lamp 152 is inserted in the central portion of core 155 and electrically connected thereto. The anode terminal insertion portion of core 155 is designed such that the first comb is tightly fitted on terminal 152a. In this manner, anode terminal 152a is tightly inserted in the anode terminal insertion portion of core 155 and is electrically connected to core 155. Lamp 152 is of a cathode high-voltage type so as to prevent the interior of box 151 from a high-voltage arrangement. The ground line of light source power source circuit board 157 (FIG. 14) extending at the side of light source unit 150 is connected to box 151 through lead wire 158a to connect anode terminal 152a of lamp 152 to the ground line of board 157 through box 151 and shielding member 154. Cathode terminal 152b of lamp 152 which extends on the rear side of reflector 153 is connected to a power line of circuit board 157 through lead wire 158b.

In television image projection apparatus B, light source unit 150 is designed such that electromagnetic shielding member 154 is formed on the front surface of box 151. An electromagnetic wave generated by lamp 152 can be shielded by box 151. At the same time, the electromagnetic wave radiated from the opening of the front surface of box can also be shielded by shielding member 154. According to the light source unit, the electromagnetic waves generated by lamp 152 can be shielded on the illumination light output side on the front surface of box 151, thus eliminating the influences of electromagnetic waves of electronic circuits (the linear circuit and display driver) in the projector, and hence eliminating the operation failures of these circuits. In addition, in light source unit 150, shielding member 154 comprises a mesh-like member consisting of very thin conductive metal films 155a, and the surfaces of films 155a are parallel to the direction of light reflected by reflector 153. The ratio of openings to shielding member 154, i.e., the ratio of light passing therethrough can be as high as about 98% (the thickness of metal films 155a is set to be 25 $\mu$m to 75 $\mu$m). Therefore, a shadow of shielding member 154 is not formed in illumination light reflected by reflector 153, or the amount of illumination light is almost not reduced.

Figure 18:
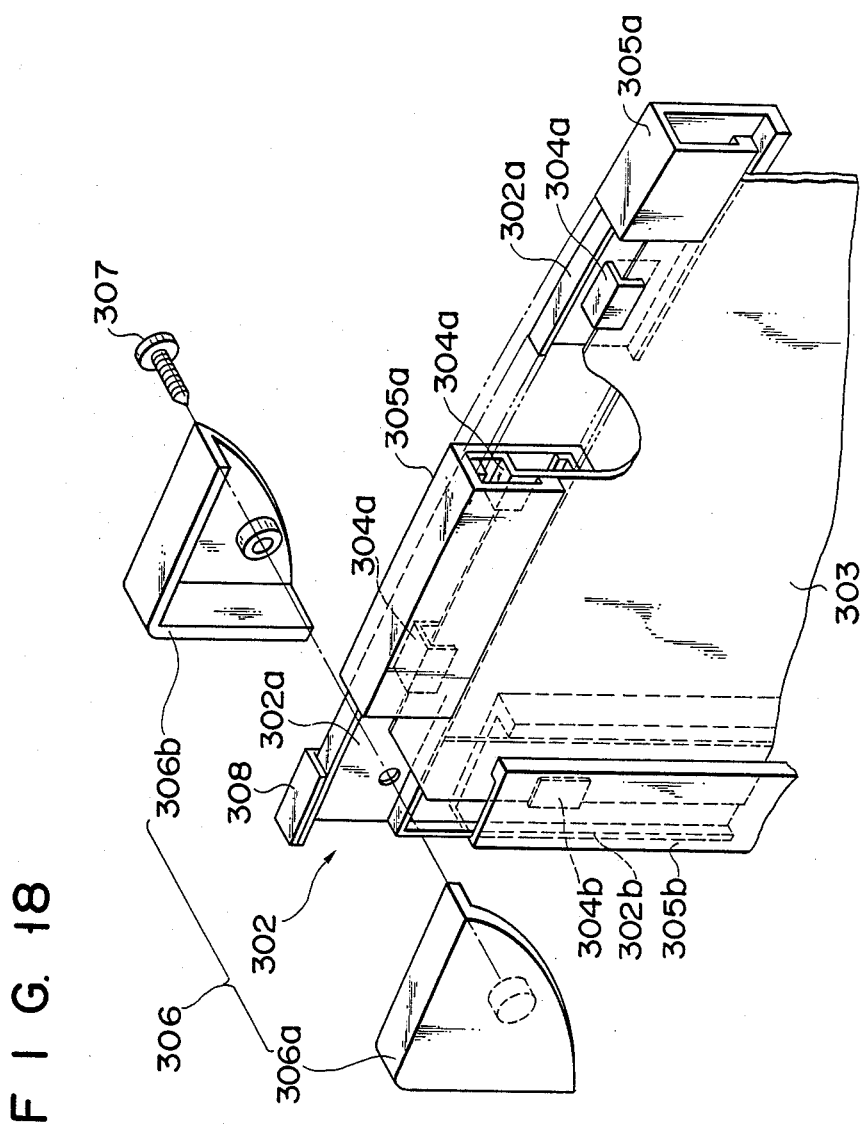
FIG. 18 is a perspective view showing a screen device according to the second embodiment.

Screen S will be described below. Referring to FIG. 13 and 18, reference symbol S denotes a screen. Screen S has a 50" size (a length of about 100 cm and a width of about 80 cm). Screen S comprises upper and lower frame members 302a and right and left frame members 302b. Screen sheet 303 is spherically taut in the frame. Frame members 302a and 302b are prepared such that a channel material of aluminum or the like is cut into pieces having predetermined lengths, and the pieces are arcuated to project toward the front side. Frame members 302a and 302b are arcuated with a given radius of curvature corresponding to that of the screen surface along the longitudinal and widthwise directions. The corresponding ends of frame members 302a and 302b are fixed by welding or screws to constitute a frame. Inverted L-shaped screen sheet hook members 304a are formed on the rear plate portions (the web of the channel) of frame members 302a at equal intervals and extend toward the front side. Lying L-shaped screen sheet hook members 304b are formed in frame members 302b at equal intervals along their entire length.

Screen sheet 303 comprises a flat sheet made of a very thin hard sheet such as a 0.25-mm thick aluminum sheet. The edge of aluminum sheet 303 is arcuated along frame members 302a and 302b, and the screen sheet is attached to frame 302 in an arcuated, i.e., recessed shape. The fixing structure of sheet 303 to frame members 302a and 302b will be described below. The edge of sheet 303 is arcuated and inserted inside hook members 304a and 304b of frame members 302a and 302b and is hooked thereby. The edge of sheet 303 is then fitted on frame members 302a and 302b along substantially the entire lengths by cover plastic covers 305a and 305b. A plastic material having a U-shaped section is cut into pieces to prepare covers 305a and 305b. Covers 305a and 305b are arcuated along frame members 302a and 302b, and the notched portions of U-shaped covers 305a and 305b are elastically fitted on frame members 302a and 302b. The edge of sheet 303 is urged against the edge of frame members 302a and 302b by edges of the notched portions of the inner surfaces of covers 305a and 305b. At the same time, the edge of sheet 303 is fixed by the notched portions of the rear surfaces of covers 305a and 305b against hook members 304a and 304b of frame members 302a and 302b. Since the edge of sheet 303 is fixed along the arcuated shape of frame members 302a and 302b, sheet 303 is arcuated by the bending force upon arcuated deformation at the upper and lower edges and by the bending force upon arcuated deformation at the right and left edges. Therefore, sheet 303 is deformed in an elliptical shape and constitutes spherical surface R recessed in the rear surface.

Reference numerals 306 denote corner members for covering the corners of frame 302, i.e., joint points of frame members 302a and 302b so as to cover covers 305a and 305b. Each corner member 306 comprises front member 306a and rear member 306b. Front and rear members 306a and 306b are matched, interposing the frame 302, and are fixed by screw 307. Referring to FIG. 18, reference numeral 308 denotes a spacer plate for supporting corresponding corner member 306 from the inside. Reference numeral 309 denotes a reinforcing member for connecting the central portion between frame members 302b and 302b of frame 302. Reinforcing member 309 is obtained by arcuating a channel member and is disposed on the rear surface side of sheet 303 while separated therefrom. Both end portions of reinforcing member 309 abut against frame members 302b and 302b through plastic covers 305b and 305b are screwed thereto. Member 309 is also utilized as a mounting portion of a stand (not shown) for supporting screen S besides reinforcement of frame 302. Therefore, screen S is located at a desired angle upon mounting of reinforcing member 309 to the stand.

In the screen described above, the edge of rectangular screen sheet 303 made of a very thin hard sheet is deformed and fixed along the edge of frame members 302a and 302b of frame 302. By deforming the edge of sheet 303 in an arcuated shape, sheet 303 is constituted as a spherical screen. Therefore, the screen can be easily manufactured and assembled such that four arcuated frame members 302a and 302b are prepared and that rectangular sheet 303 can be easily attached to four arcuated frame members 302a and 302b.

All projection display apparatuses described above use a liquid crystal display device. Nonetheless, other display devices can be used in the present invention. For example, use can be made of an electrochromatic device whose display segments become colorless and colored when reduced and oxidized and whose response speed decreased at a high temperature.

What is claimed is:

1. A projection display apparatus, comprising:
   housing means partitioned by partitioning means into a light source compartment and a display compartment, said light source and display compartments being provided with vent openings, respectively, and said partitioning means including light transmitting means;
   light source means disposed in said light source compartment and including a lamp and a reflector;
   display means disposed in said display compartment for displaying an optical image, said display means being driven by electrical energy;
   heat radiation means adhered to said display means for cooling said display means and including a heat conductive pipe having a plurality of radiation fins thereon, said heat radiation means having a symmetrical structure so as to circulate an air flow in said display compartment;
   projection means for enlarging and projecting said image displayed on said display means on a screen; and
   vent fan means for ventilating both said light source compartment and said display compartment through said vent openings.

2. An apparatus according to claim 1, wherein said plurality of fins are disposed in two groups located respectively on two ends of said pipe and the fins of each group are parallel to each other.

3. An apparatus according to claim 1, wherein said fins are inclined in said display compartment such that fin surfaces opposite to said fan are directed toward a center of said fan.

4. A projection display apparatus comprising:
   a light source unit comprising a parabolic reflector, a lamp, and a metal plate, said lamp being provided with a light-emitting portion, an anode, and a cathode, said anode and said cathode being located to interpose said light-emitting portion, said light-emitting portion being located at a focal point of said reflector, and said anode and said cathode being present on an axis of said reflector, and said metal plate being adapted to entirely cover at least sides of said reflector, said lamp being fixed to said reflector such that the other end of said lamp is inserted in a neck formed in said reflector and is fixed by an adhesive filled in said neck;
   a display unit having a display device and a cooler coupled to said display device;
   an optical unit having at least one lens to enlarge an image displayed on said display device;
   cooling means for cooling at least said light source unit; and
   a housing for accommodating said light source unit, said display unit, said optical unit, and said cooling means.

5. An apparatus according to claim 4, wherein said light source unit comprises a support plate fixed by an adhesive filled in said neck of said reflector and a permanent magnet mounted on said support plate.

6. A projection display apparatus comprising:
   housing means partitioned by partitioning means into a light source compartment and a display compartment, said light source and display compartments being provided with vent openings, respectively, and said partitioning means including light transmitting means;
   light source means disposed in said light source compartment and including a lamp and a reflector;
   display means disposed in said display compartment for displaying an optical image driven by electrical energy;
   heat radiation means adhered to said display means and including a volatile liquid for evaporating to vapor by absorbing radiation heat from said light source means, and means for liquefying the vapor by air cooling;
   projection means for enlarging and projecting the image displayed on said display means on a screen; and
   vent fan means for ventilating both said light source compartment and said display compartment through said vent openings.

7. An apparatus according to claim 6 wherein said volatile liquid of said heat radiation means is a transparent liquid.

8. An apparatus according to claim 7, wherein said means for liquefying the vapor of said volatile liquid by air cooling includes a symmetrical structure including a heat conductive pipe having a plurality of radiation fins thereon for air cooling in a manner for circulating an air flow in said display compartment.

9. An apparatus according to claim 8, wherein said heat conductive pipe is inserted in the upper portion of a cooling vessel containing said volatile liquid and has closed ends extending outside said cooling vessel which are equipped with said fins, a volatile working fluid having a high latent heat coefficient being sealed in said pipe.

* * * * *